United States Patent
Miller et al.

(10) Patent No.: US 10,517,237 B2
(45) Date of Patent: Dec. 31, 2019

(54) LATERAL IRRIGATION SYSTEM WITH IMPROVED END-OF-RUN CONTROL

(71) Applicant: LINDSAY CORPORATION, Omaha, NE (US)

(72) Inventors: Mark William Miller, Elkhorn, NE (US); Luke Barker, Missouri Valley, IA (US); John Grabow, Fort Calhoun, NE (US)

(73) Assignee: Lindsay Corporation, Omaha, NE (US)

( * ) Notice: Subject to any disclaimer, the term of this patent is extended or adjusted under 35 U.S.C. 154(b) by 239 days.

(21) Appl. No.: 15/590,607

(22) Filed: May 9, 2017

(65) Prior Publication Data

US 2018/0325048 A1 Nov. 15, 2018

(51) Int. Cl.
*A01G 25/00* (2006.01)
*A01G 25/09* (2006.01)
*A01M 7/00* (2006.01)

(52) U.S. Cl.
CPC ......... *A01G 25/097* (2013.01); *A01M 7/0089* (2013.01)

(58) Field of Classification Search
CPC .... A01G 25/092; A01G 25/16; A01G 25/162; A01G 25/165
USPC ........................................ 239/735, 726, 729
See application file for complete search history.

(56) References Cited

U.S. PATENT DOCUMENTS

| | | | | |
|---|---|---|---|---|
| 2,750,228 A | * | 6/1956 | Engel | A01G 25/09 239/736 |
| 3,628,729 A | * | 12/1971 | Thomas | A01G 25/092 239/729 |
| 3,802,627 A | * | 4/1974 | Seckler | A01G 25/092 239/729 |
| 3,979,062 A | * | 9/1976 | Christensen | A01G 25/092 239/11 |
| 4,036,436 A | * | 7/1977 | Standal | A01G 25/097 239/733 |
| 4,223,839 A | * | 9/1980 | Bleakney | A01G 25/092 137/614.06 |
| 4,295,607 A | * | 10/1981 | Noble | A01G 25/097 239/1 |
| 4,340,183 A | * | 7/1982 | Kegel | B05B 3/12 239/729 |
| 4,432,494 A | * | 2/1984 | Hunter | A01G 25/092 239/729 |
| 4,508,269 A | * | 4/1985 | Davis | A01G 25/092 239/729 |

(Continued)

Primary Examiner — Viet Le
(74) Attorney, Agent, or Firm — Hovey Williams LLP

(57) ABSTRACT

A lateral move irrigation system more effectively irrigates a field by minimizing the portions of the field that receive no irrigation. The irrigation system includes a plurality of mobile towers, a plurality of elongated support structures attached to and extending between the towers, and a fluid delivery system. Each mobile tower has wheels and a motor for driving the wheels. A safety circuit stops the motors on all the mobile towers when any of the towers reaches an end-of-run position. Location determining components determine locations of the mobile towers as they traverse a field, and a control system stops or slows any of the towers before they trigger the safety circuit so that lagging mobile tower may catch up before the safety circuit shuts down or reverses all the motors.

20 Claims, 9 Drawing Sheets

(56) References Cited

U.S. PATENT DOCUMENTS

| | | | | |
|---|---|---|---|---|
| 4,569,481 A * | | 2/1986 | Davis | A01G 25/092 239/729 |
| 4,674,681 A * | | 6/1987 | Meis | A01G 25/097 239/1 |
| 5,246,164 A * | | 9/1993 | McCann | A01B 79/005 239/11 |
| 5,695,129 A * | | 12/1997 | Korus | A01G 25/092 239/729 |
| 6,039,273 A * | | 3/2000 | Christensen | A01G 25/092 239/729 |
| 6,042,031 A * | | 3/2000 | Christensen | A01G 25/092 239/729 |
| 6,045,065 A * | | 4/2000 | Gerdes | A01G 25/092 239/1 |
| 6,085,999 A * | | 7/2000 | Gerdes | A01G 25/092 239/66 |
| 6,095,439 A * | | 8/2000 | Segal | A01G 25/092 239/69 |
| 6,290,151 B1 * | | 9/2001 | Barker | A01G 25/092 239/69 |
| 6,431,475 B1 * | | 8/2002 | Williams | A01G 25/09 239/740 |
| 6,666,384 B2 * | | 12/2003 | Prandi | A01G 25/092 239/1 |
| 6,923,390 B1 * | | 8/2005 | Barker | A01G 25/092 239/728 |
| 7,140,563 B2 * | | 11/2006 | Sinden | A01G 25/097 239/722 |
| 7,311,275 B2 * | | 12/2007 | Korus | A01G 25/092 180/233 |
| 7,384,008 B1 * | | 6/2008 | Malsam | A01G 25/092 239/728 |
| 8,401,704 B2 * | | 3/2013 | Pollock | A01G 25/092 239/723 |
| 8,720,803 B1 * | | 5/2014 | Standley | B05B 3/18 239/407 |
| 8,849,467 B2 * | | 9/2014 | Korus | A01G 25/092 239/722 |
| 8,936,208 B2 * | | 1/2015 | Pfrenger | A01G 25/092 239/737 |
| 8,998,117 B2 * | | 4/2015 | Bauman | A01G 25/097 239/69 |
| 9,301,459 B1 * | | 4/2016 | Williams | A01G 25/092 |
| 9,326,461 B2 * | | 5/2016 | Wolgast | A01G 25/092 |
| 9,622,398 B2 * | | 4/2017 | Gaus | A01B 51/023 |
| 9,677,242 B2 * | | 6/2017 | Theilen | E02D 5/80 |
| 9,974,246 B2 * | | 5/2018 | Frager | A01G 25/092 |
| 2002/0107586 A1 * | | 8/2002 | Kreikemeier | G05B 19/0423 700/65 |
| 2006/0289676 A1 * | | 12/2006 | Korus | A01G 25/092 239/159 |
| 2007/0162209 A1 * | | 7/2007 | Gallaun | A01G 25/092 701/50 |
| 2007/0267524 A1 * | | 11/2007 | MacK | A01G 25/092 239/729 |
| 2010/0127103 A1 * | | 5/2010 | Toman | A01G 25/092 239/726 |
| 2012/0305682 A1 * | | 12/2012 | Korus | A01G 25/092 239/731 |
| 2013/0026259 A1 * | | 1/2013 | Korus | A01G 25/092 239/729 |
| 2013/0026260 A1 * | | 1/2013 | Korus | A01G 25/09 239/729 |
| 2013/0026261 A1 * | | 1/2013 | Korus | A01G 25/095 239/729 |
| 2013/0090766 A1 * | | 4/2013 | Pfrenger | A01G 25/092 700/275 |
| 2013/0134240 A1 * | | 5/2013 | Malsam | A01G 25/09 239/728 |
| 2014/0263766 A1 * | | 9/2014 | Venton-Walters | A01G 25/09 239/726 |
| 2015/0060580 A1 * | | 3/2015 | Welch | A01G 25/092 239/729 |

* cited by examiner

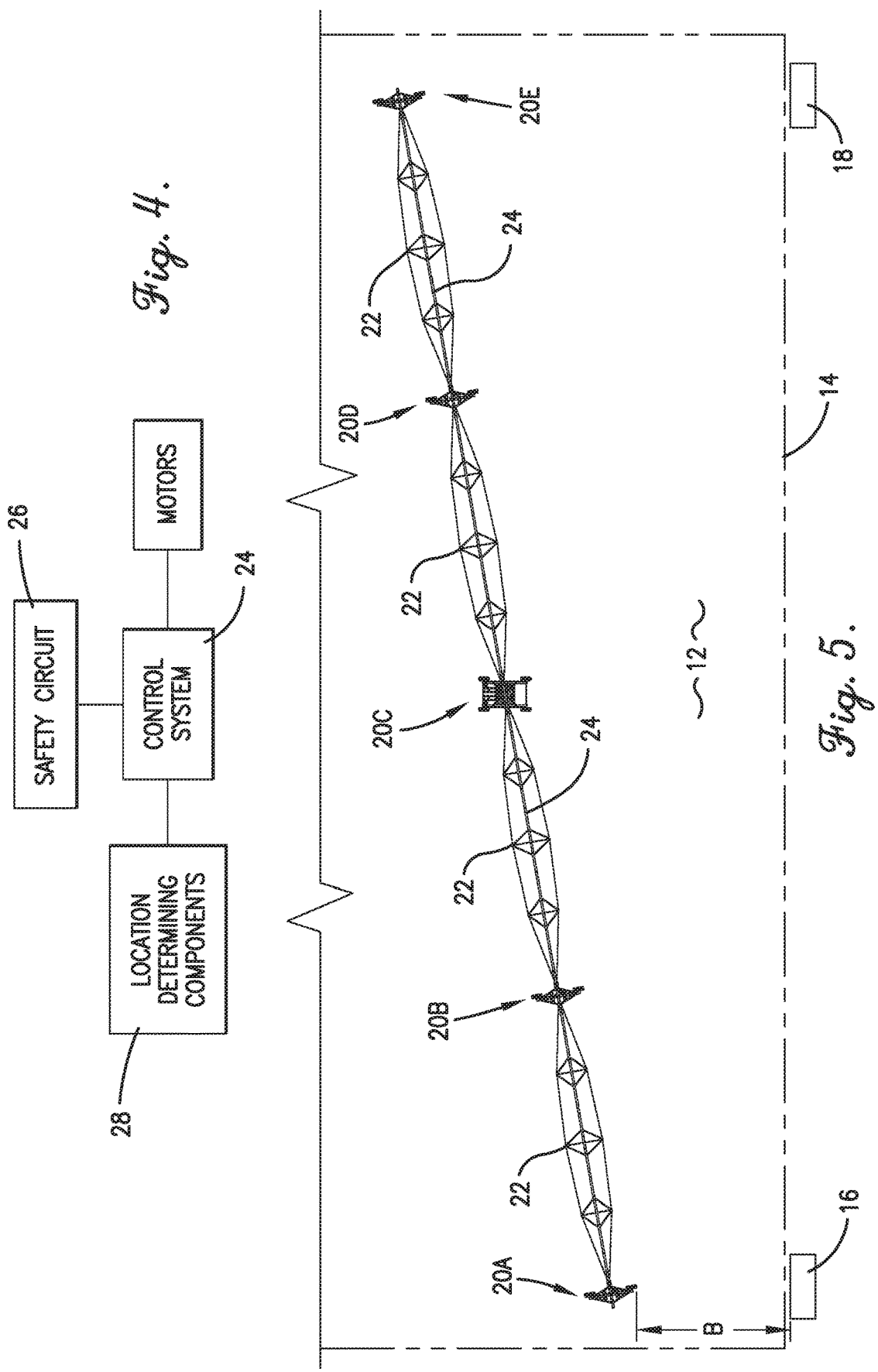

LATERAL IRRIGATION SYSTEM WITH IMPROVED END-OF-RUN CONTROL

BACKGROUND

Irrigation systems are frequently used to deposit water, fertilizers, pesticides, and/or other fluids throughout a field of crops. Most irrigation systems are either center pivot or lateral (or linear) move type. Center pivot irrigation systems move in a circle or semi-circle about a central pivot while lateral irrigation systems move along a generally straight line across a square or rectangular-shaped field.

As shown in prior art FIGS. 1 and 2, a typical lateral irrigation system A includes a number of mobile towers B, interconnecting support sections C, and fluid-carrying conduits and sprinklers supported below the support sections for delivering fluids to areas beneath the irrigation system. The mobile towers are driven by motors to move the irrigation system back and forth across a field. A safety circuit with one or more switches or other devices shuts-down the motors when the mobile towers reach end-of-run barricades D or other objects that mark field boundaries or particular areas within a field. Typically, the safety switches are mounted to at least the leftmost and rightmost mobile towers to engage, sense, or otherwise interact with left and right end-of-run barricades, respectively. When either switch is triggered, the motors of all the mobile towers are stopped so that no portion of the irrigation system travels beyond a field boundary or other designated area.

Unfortunately, these safety switches can cause large areas of a field to remain unirrigated if one end of the irrigation system reaches the end of a field before the opposite end does. This may occur, as shown in prior art FIG. 1, if the motors on one side of the irrigation system move their respective mobile towers at a faster rate than the motors on the opposite side of the irrigation system. This may also occur, as shown in prior art FIG. 2, when a field boundary is not perpendicular to the lateral path of an irrigations system. In both cases, the safety circuit stops all movement of the irrigation system when any of the safety switches are activated, often leaving a generally wedge-shaped portion of the field with no irrigation. The unirrigated area can be quite large, especially for long irrigation systems. For example, a 1,250 foot long irrigation system with one end that stops 150 feet before a field boundary leaves an unirrigated area of over 2 acres.

Accordingly, there is a need for a lateral irrigation system that overcomes the limitations of the prior art.

SUMMARY

Embodiments of the present invention solve the above described problems by providing a lateral move irrigation system that more effectively irrigates a field by minimizing portions of the field that receive no irrigation.

An embodiment of the irrigation system includes a plurality of mobile towers, a plurality of elongated support structures attached to and extending between the towers, and a fluid delivery system. The towers include at least a left end mobile tower and a right end mobile tower, with each tower having wheels and a motor for driving the wheels. The fluid delivery system may comprise one or more conduits attached to or extending through at least a portion of the support structures and configured to output water, pesticides, fertilizers, and/or other fluids from orifices formed therein.

The irrigation system further includes a safety circuit that stops the motors on all the mobile towers when any of the mobile towers is within a first pre-determined distance A of an end-of-run position. The end-of-run position may be a field boundary, a designated spot in a field, or any other designated position in or near a field. This prevents any portion of the irrigation system from striking an end-of-run barricade or otherwise traveling beyond a designated field boundary.

The irrigation system further includes location determining components for determining locations of the mobile towers as they traverse the field and a control system in communication with the location determining components for controlling the fluid delivery system and/or the motors on the mobile towers so as to deliver a controlled amount of fluids to the field as the irrigation systems traverses the field.

In accordance with an important aspect of the invention, the control system is also configured to monitor the positions of the mobile towers and stop or slow the motor on any of the mobile towers if it reaches a second pre-determined distance B of its end-of-run position before the other mobile towers reach this same distance B from their end-of-run positions. Distance B is greater than distance A, such that the control system stops or slows the leading tower before it reaches the point at which the safety circuit stops all the motors of the irrigation system. This permits the lagging mobile towers to catch up to the leading tower. Or, for fields with a boundary that is not perpendicular to the path of travel of the irrigation system, this allows the mobile tower or towers with more remaining field to irrigate to continue to move ahead of the tower or towers that are nearer their end-of-run positions. Once all of the mobile towers are within distance B of their respective end-of-run positions, the control system may operate all the motors at substantially the same speed until one of the towers reaches distance A from its end-of-run position, at which time the safety circuit shuts down or reverses all the motors. This ensures that the irrigation system isn't stopped by the safety circuit until all the mobile towers are close to their end-of-run positions and thus minimizes unirrigated areas.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 4 is a block diagram depicting control components of the lateral irrigation system of FIG. 3.

FIG. 5 is a top schematic view of the lateral irrigation system of FIGS. 3 and 4 operating in accordance with embodiments of the present invention.

Figure 1:
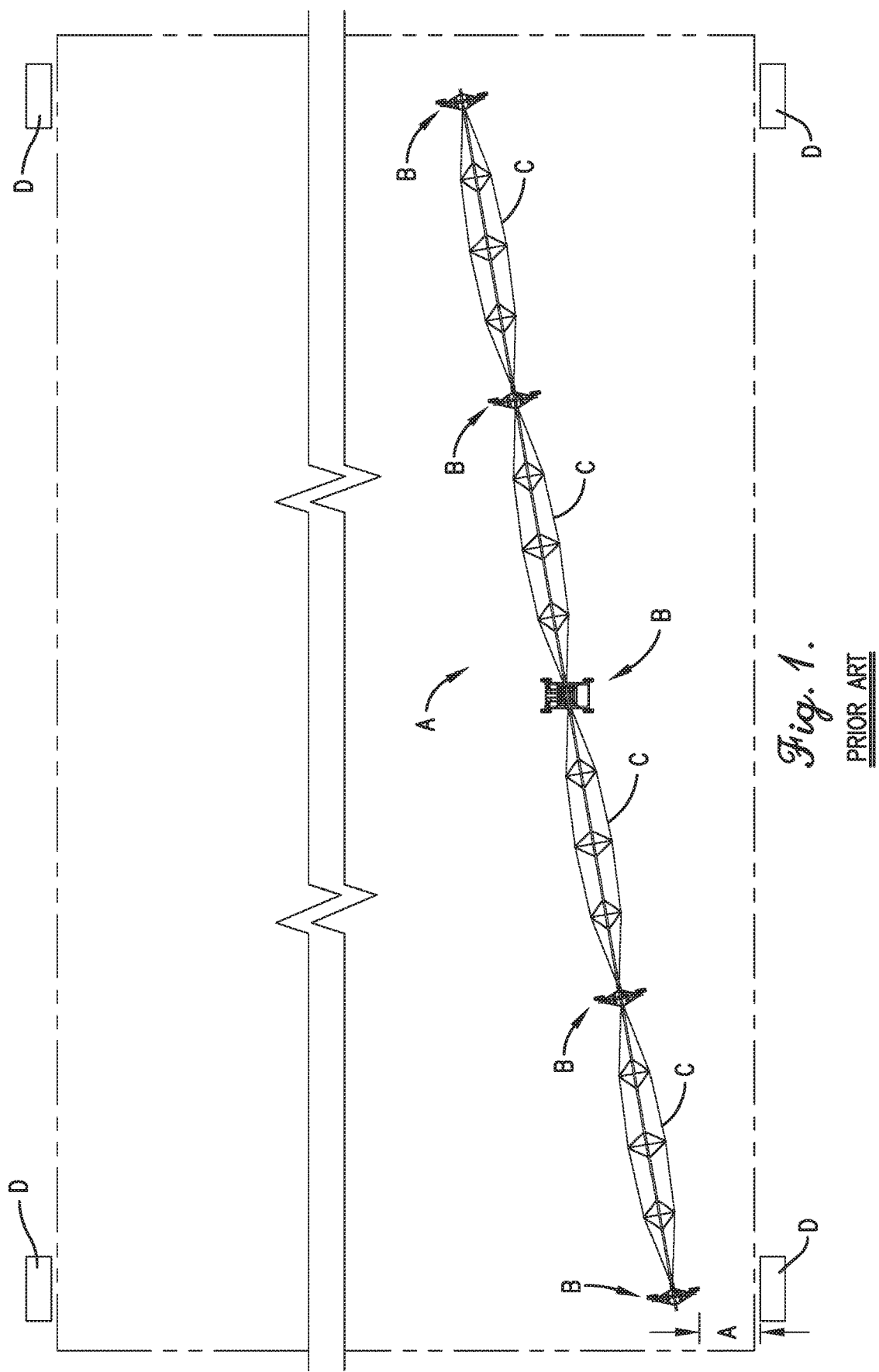
FIG. 1 is a top schematic view of a lateral irrigation system operating in accordance with a prior art control scheme.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 3:
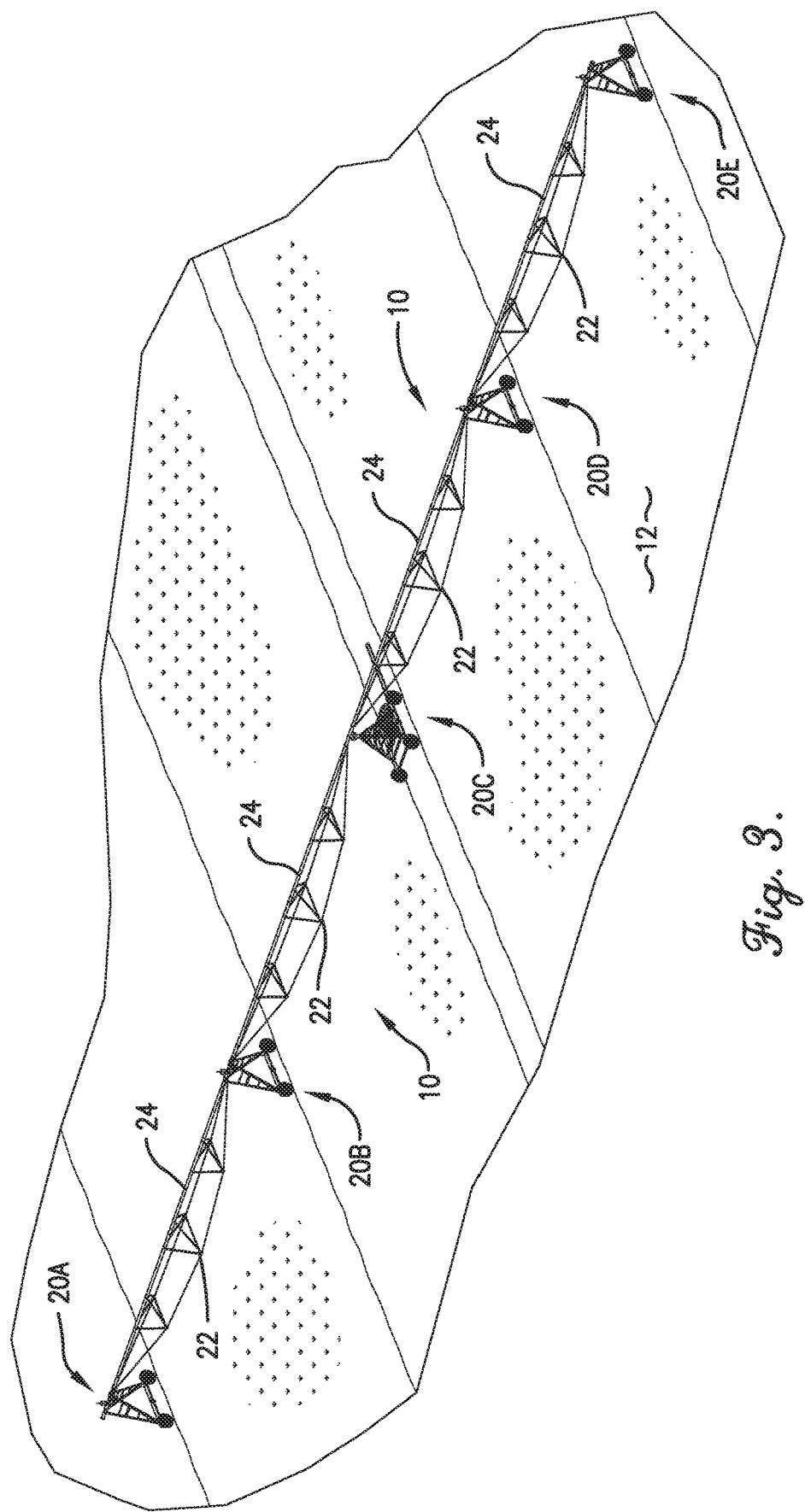
FIG. 3 is a perspective view of an exemplary lateral irrigation system on which the principles of the present invention may be implemented.

Turning now to the drawing figures, and initially FIG. 3, an irrigation system 10 constructed in accordance with embodiments of the present invention is shown irrigating a field 12. One embodiment of the irrigation system is a lateral move irrigation system that moves in a generally lateral direction across the field 12 and reverses to travel in the opposition direction once it reaches the end of field. However, the principles of the present invention may also be used with center pivot irrigation systems and other types of irrigation systems that stop and reverse direction after reaching a boundary or end-of-run position.

The field 12 in which the irrigation system 10 operates may be of any shape and size and has at least one boundary 14 at which the irrigation system 10 must stop and/or reverse direction as shown in FIGS. 5-10. The boundary 14 may be next to a road, building, property line, or other physical or structural element or may be simply a point in a field at which an operator wishes to stop and/or reverse direction of the irrigation system. End-of-run barricades, posts, fences, buried cables or other boundary markers 16, 18 may be placed near the boundary 14, the purpose of which are described below. In one embodiment, a left boundary marker 16 is placed near the left side of the field boundary 14 and a right boundary marker 18 is placed near the right side of the field boundary.

An embodiment of the irrigation system 10 is depicted in FIG. 3 and comprises a number of mobile towers 20A-E and support structures 22 interlinking the towers 20A-E. One or more joints may pivotally connect the support structures 22 to one another and/or to the towers 20A-E so that spans of the irrigation system may pivot relative to one another. The irrigation system also includes a fluid delivery system 24 through which water or other liquids are delivered to the field 12. As illustrated in FIG. 4, the irrigation system 10 also comprises a safety circuit 26, at least one location determining component 28, and a control system 30, all of which are described in more detail below.

The irrigation system 10 may include any number of mobile towers 20, but includes at least a left end mobile tower 20A and a right end mobile tower 20E. Each of the towers may comprise a frame of any shape and one or more wheels 32 rotatably attached to the frame. In some embodiments of the invention, the frames are made of one or more rods shaped in a substantially triangular or A-frame configuration having lower leg portions configured for attaching the wheels thereto. Additionally or alternatively, the frames of the towers may be made of one or more rods shaped in a substantially narrow rectangular shape with leg portions extending horizontally outward and then angled downward therefrom for attaching the wheels thereto.

The wheels 32 illustrated and described herein are merely examples of mechanisms for permitting movement of the irrigation system 10. The term "wheel" or "wheels" as used herein may refer to conventional circular wheels, skis, skids, tank tracks and wheels, rollers on a track, or any mechanism on which the mobile towers 20A-E may travel forward or aft relative to the ground.

The irrigation system also includes a number of motors 34 for driving the wheels 32 and moving the mobile towers 20A-E. Preferably, each mobile tower 20A-E has its own motor, but in some embodiments the number of motors may be more or less than the number of mobile towers. The motors may include or be connected with integral or external relays so they may be turned on, off, and/or reversed by the control system 24 or another control device. The motors 34 may have several speeds or be equipped with variable speed drives. One of the mobile towers 20C may include a mobile hose cart with a traveling winch and/or other various actuation components configured for reeling and unreeling a fluid supply line as the irrigation system traverses the field 12.

Although not required, some or all of the mobile towers 20A-E may be equipped with steerable wheels pivoted about upright axes by suitable steering motors, allowing the towers to pivot one or more of the support structures 22 relative to others of the support structures about one of the joints. U.S. Pat. No. 4,508,269 in the name of Davis et al. is hereby incorporated by reference in its entirety into the present specification for a disclosure of ground drive motors and steering motors associated with an irrigation machine.

The irrigation system 10 may include any number of the support structures 22, each spanning a distance between adjacent ones of the mobile towers 20, as illustrated in FIG. 3. Each of the support structures 22 may be fixedly or pivotally connected with at least one of the towers and/or each other to form a number of interconnected spans. In some embodiments of the invention, the support structures 22 may be elongated rigid truss structures, booms, conduits pipes, bars, extension arms, or other structures of various configurations. However, the support structures 22 may have any shapes and dimensions without departing from the scope of the invention. In some embodiments of the invention, one or more of the support structures 22 may be an extension arm having a first end fixedly or pivotally joined with one of the towers 20 and a second free-standing end.

The support structures 22 may carry or otherwise support portions of the fluid delivery system 24. Specifically, portions of the fluid delivery system 24 may attach to and/or be supported by the support structures 22, such that water and/or any other liquid may be dispensed at given intervals along a length of the support structures 22. A plurality of sprinkler heads, spray guns, drop nozzles, or other fluid-emitting devices may be spaced along the support structures 22 and/or at one or more of the towers 20A-E to apply water and/or other fluids to land underneath the irrigation system 10.

In some embodiments of the invention, the support structures 22 may be integrated with the fluid delivery system 24. For example, each of the support structures 22 may comprise rigid pipes or conduits which span two of the towers 20 and are in fluid communication with a water source, such that water may flow through therethrough. In this embodiment of the invention, the support structures 22 may also comprise inlets and outlets for dispensing water or any other liquid desired to be applied to the field 12.

The fluid delivery system 24 may comprise one or more conduits and one or more fluid-emitting devices, such as sprinkler heads, drip holes formed in the conduits, spray nozzles, or other fluid emitters. Each of the fluid-emitting devices may be fixed to one of the towers 20, the support structures 22, or to any part of the irrigation system 10. At least one of the fluid-emitting devices may comprise and/or be fluidly connected to a supply/shut-off valve for turning water on and off to the fluid-emitting devices and controlling how much water is provided to the fluid-emitting devices. The supply/shut-off valve may be actuated manually, electronically, remotely, and/or automatically by the control system, which may be physically and/or communicably coupled with the supply/shut-off valve.

The conduits may be hoses or pipes fluidly linking the fluid-emitting devices with a fluid supply or source. A pump or any other actuation means may be used to force water or another fluid through the conduits to the fluid-emitting devices. In some embodiments of the invention, the conduits may further comprise a drop pipe fluidly connected to the conduits to allow for a drain and flushing of fluid in the conduits. Furthermore, in some embodiments of the invention, the support structures 22 may also serve as one or more of the conduits of the fluid delivery system 24.

Fluid supplies and/or supply hook-ups, such as hydrants, may be located at various locations relative to the field, and the conduits may be configured to attach to the nearest one of the fluid supplies. The fluid supply may alternatively be a water canal or any other fluid source extending along a length of the field. The fluid delivery system 24 may also comprise one or more pumps configured to pump water to and through the conduits.

The safety circuit 26 stops and/or reverses the motors 34 of the towers 20A-E when any portion of the irrigation system reaches the field boundary 14 or other end-of-run position. In one embodiment, the safety circuit includes shut-off switches with actuators mounted on the left and right end mobile towers 20A, 20E that stop and/or reverse all the motors of the irrigation system when either of the actuators engages the end-of-run boundary markers 16, 18. In other embodiments, the safety circuit may employ sensors configured to detect buried wires near field boundaries, GPS receivers for determining positions of the mobile towers 20A-E in the field 12, laser ranging devices for determining distances between the mobile towers and the markers 16, 18, or any other devices capable of determining when one or more of the mobile towers is approaching a boundary marker.

The location determining components 28 may be any sensors, switches or other devices capable of determining the positions of the mobile towers 20A-E in the field and/or the distances of the mobile towers from the boundary markers. The location determining components 28 may be, for example, sensors configured to detect buried wires indicating field boundaries, GPS receivers for determining geographic positions of the mobile towers, or laser ranging devices for determining distances between the mobile towers and the boundary markers. In some embodiments, the distance-measuring or location-determining functions of the safety circuit and location determining components may be performed by the same devices.

The control system 30 is coupled with the motors 34 on the mobile towers 20A-E, the safety circuit 26, the location-determining components 28, the fluid delivery system 24, and other sensors and devices on the irrigation system and is configured for controlling movement of the towers 20A-E, turning water on or off, etc. The control system 30 may comprise any number of processors, controllers, integrated circuits, programmable logic devices, or other computing devices and resident or external memory for storing data and other information accessed and/or generated by the irrigation system 10. The control system may also simply comprise on/off switches and no memory elements. The control system may be physically located on one of the towers 20A-E or remotely located and configured to transmit control signals to various motors, switches, and/or actuation devices of the irrigation system 10.

The control system 30 may implement a computer program and/or code segments to perform the functions and methods described herein. The computer program may comprise an ordered listing of executable instructions for implementing logical functions in the control system. The computer program can be embodied in any computer readable medium for use by or in connection with an instruction execution system, apparatus, or device, and execute the instructions. In the context of this application, a "computer readable medium" can be any physical apparatus that can contain, store, communicate, propagate, or transport the program for use by or in connection with the instruction execution system, apparatus, or device. The computer readable medium can be, for example, but not limited to, an electronic, magnetic, optical, electro magnetic, infrared, or semi conductor system, apparatus, or device. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM).

The memory may be integral with control system, stand alone memory, or a combination of both. The memory may include, for example, removable and non removable memory elements such as RAM, ROM, flash, magnetic, optical, USB memory devices, and/or other conventional memory elements. The memory may store various data associated with the operation of the irrigation system 10, such as the computer program and code segments mentioned above, or other data for instructing irrigation system 10 to perform the steps described herein. Furthermore, the memory may store, for example, field sizes, geographic coordinates of field boundaries, amounts of water or liquid to dispense, sequence/timing and parameters for actuating the mobile tower motors, fluid delivery system, etc. The various data stored within the memory may also be associated within one or more databases to facilitate retrieval of the information.

The control system 30 may compare the geographic coordinates with parameters stored in its memory to determine where the irrigation system 10 is in the field 12 and how far the mobile towers 20A-E are from field boundaries and/or end-of-run positions. The control system may use this information to determine if any of the mobile towers should be stopped or slowed to prevent them from crossing a field boundary as explained in more detail below.

Figure 2:
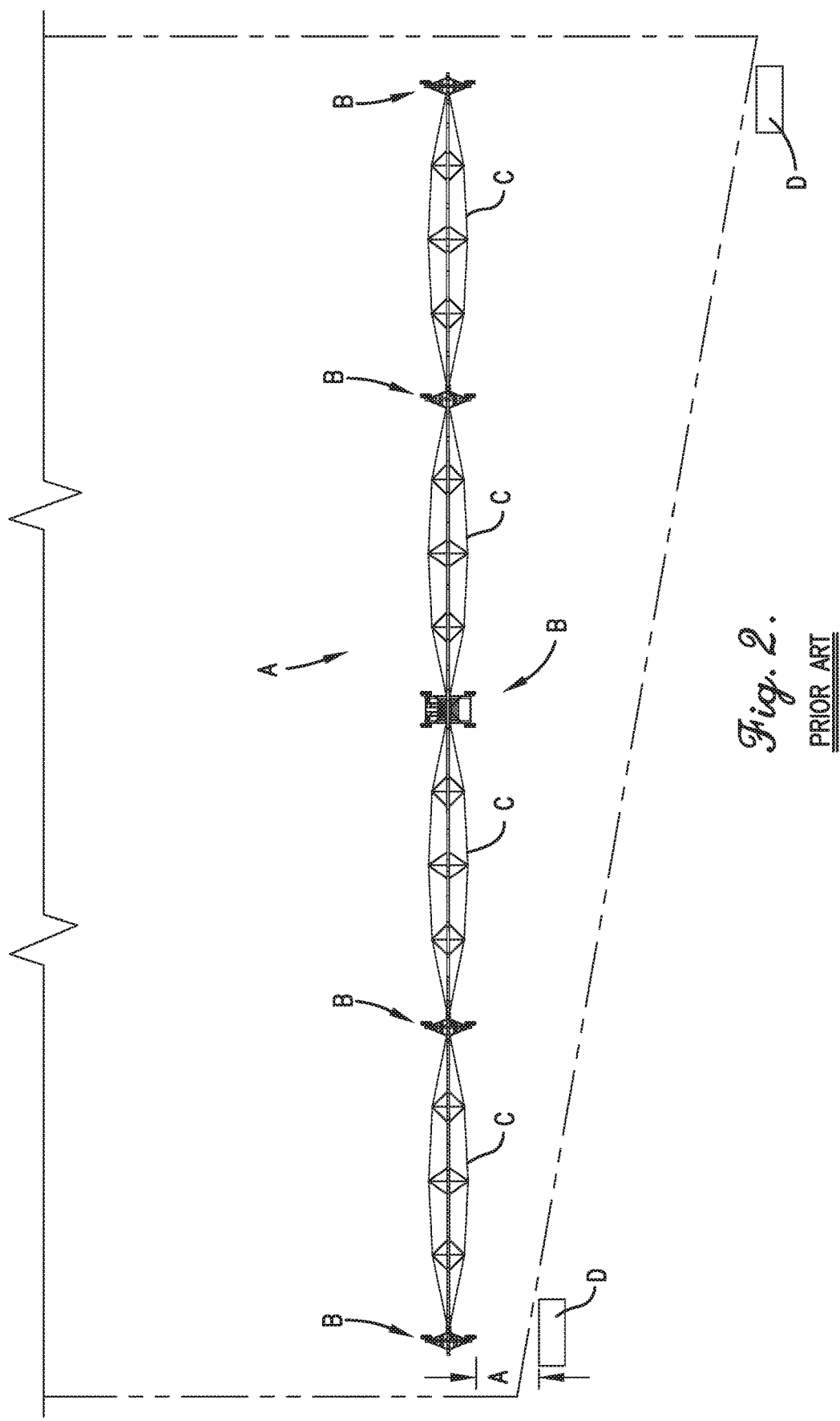
FIG. 2 is another top schematic view of a lateral irrigation system operating in accordance with a prior art control scheme.

Specific operational embodiments of the control system 30 will now be described in connection with reference distances or positions, including distance A and distance B. Distance A, also referred to herein as a "first pre-determined distance", is the distance between a mobile tower and an end-of-run boundary marker at which the safety system shuts down all the motors of the irrigation system as discussed above and as illustrated in FIGS. 1 and 2. Distance A may be any distance, but is typically ½-5 feet. Distance B, also referred to herein as a "second pre-determined distance", is any distance greater than distance A. As described in more detail below, the control system monitors distance B so that it may take corrective actions to move all of the mobile towers 20A-E as close as possible to the field boundary 14 or other end-of-run position before any of the mobile towers reaches distance A and triggers the safety system to shut down all the motors of the irrigation system. Distance B may be any distance greater than A, but is typically at least 10 feet greater than distance A.

Figure 6:
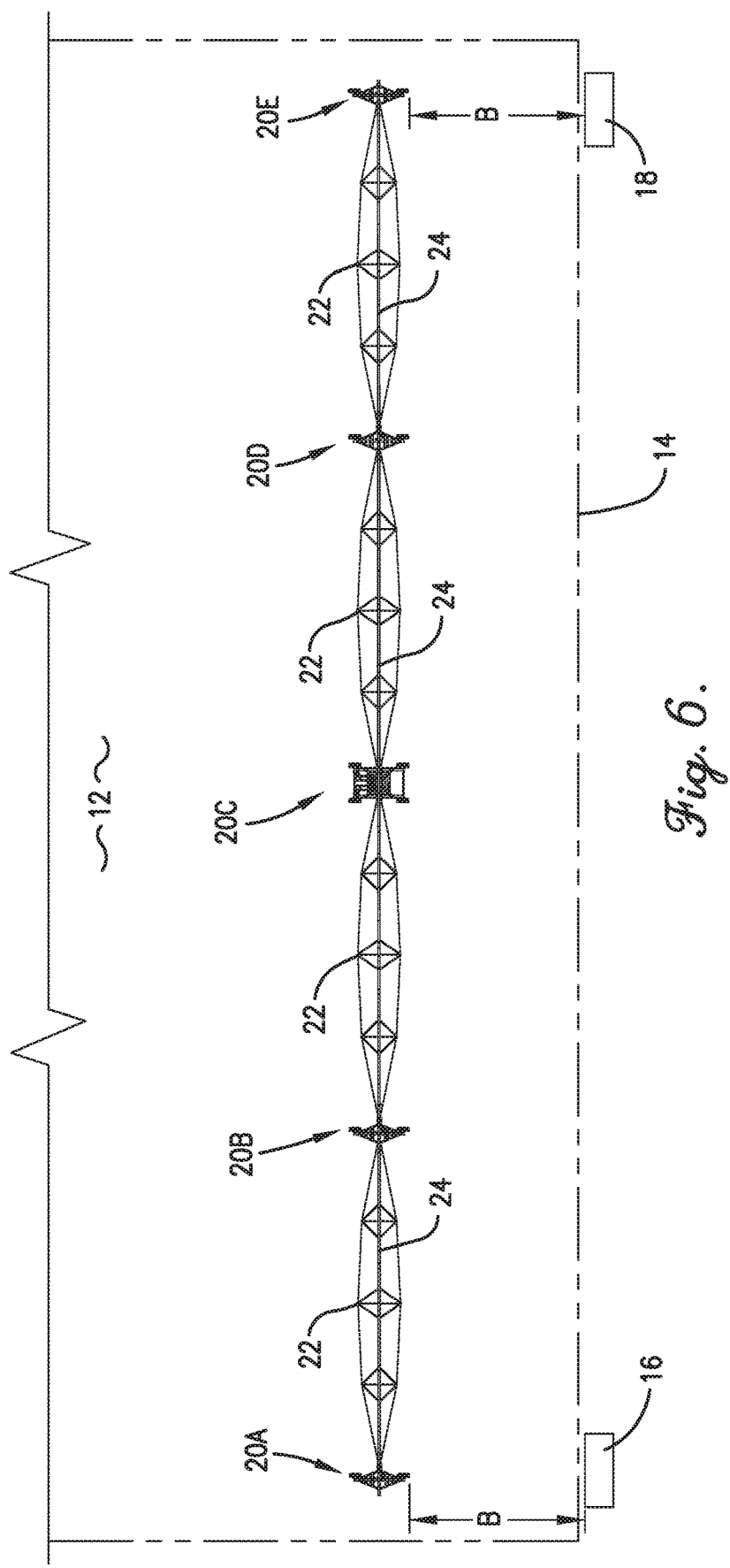
FIG. 6 is another top schematic view of the lateral irrigation system of FIGS. 3 and 4 operating in accordance with embodiments of the present invention.
Figure 7:
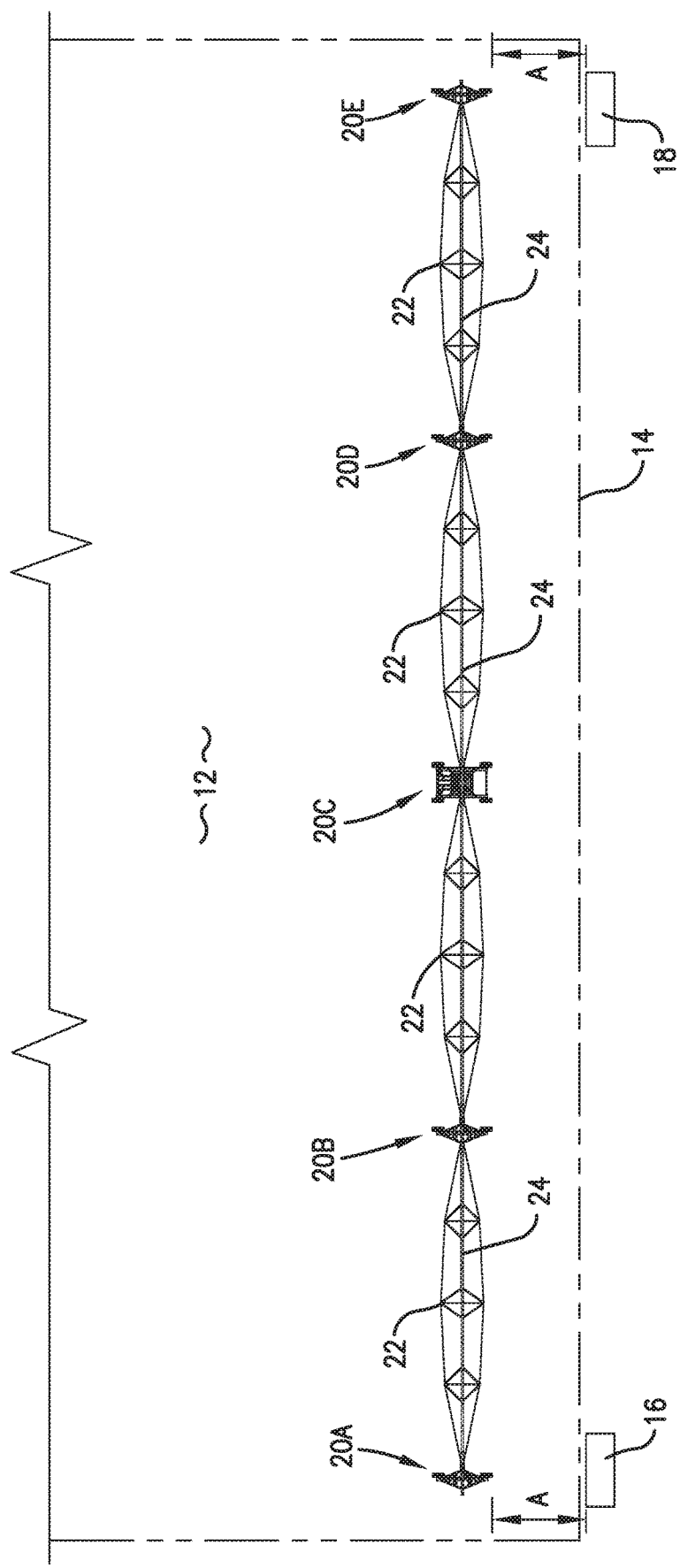
FIG. 7 is another top schematic view of the lateral irrigation system of FIGS. 3 and 4 operating in accordance with embodiments of the present invention.
Figure 8:
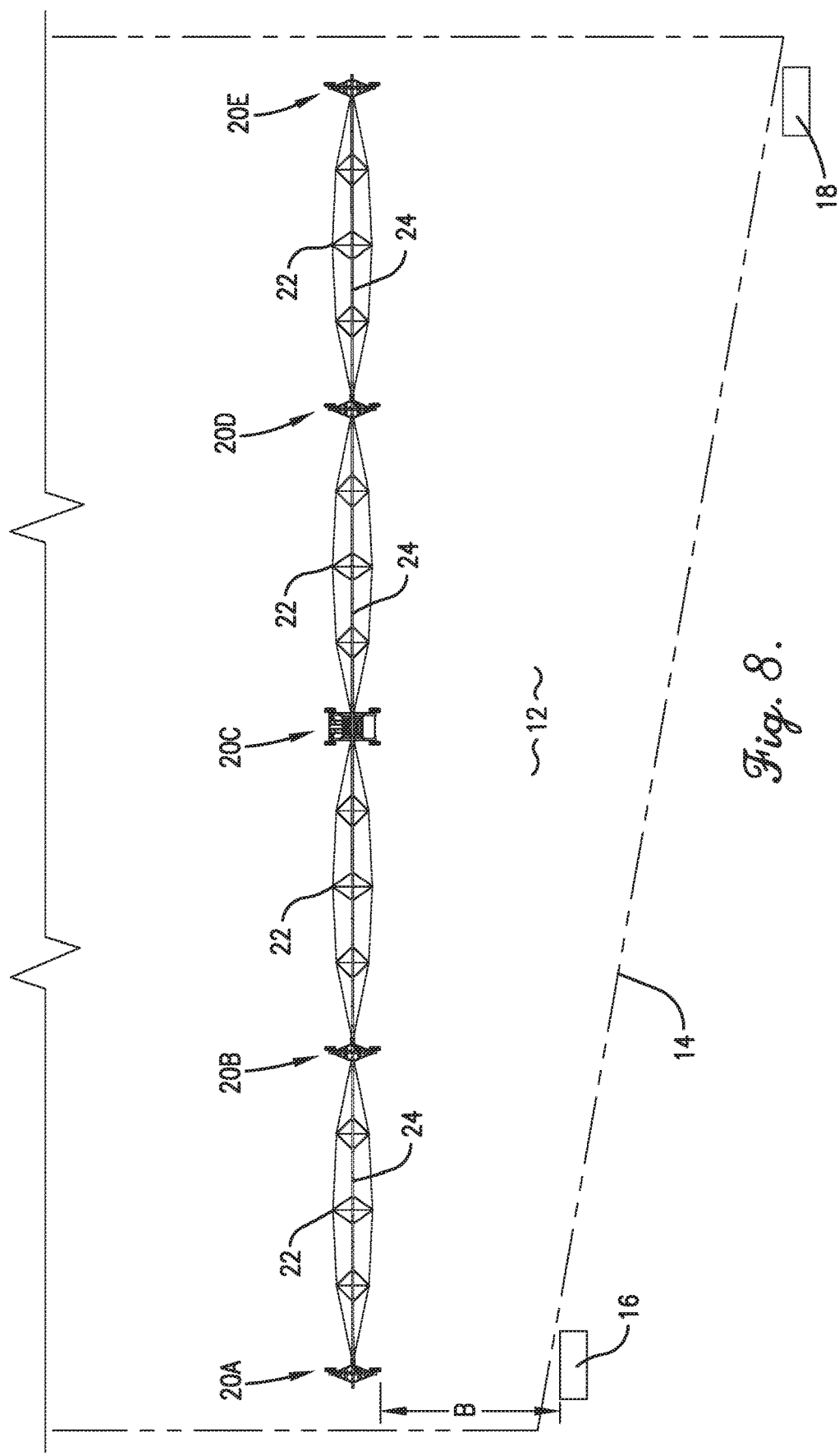
FIG. 8 is another top schematic view of the lateral irrigation system of FIGS. 3 and 4 operating in accordance with embodiments of the present invention.
Figure 9:
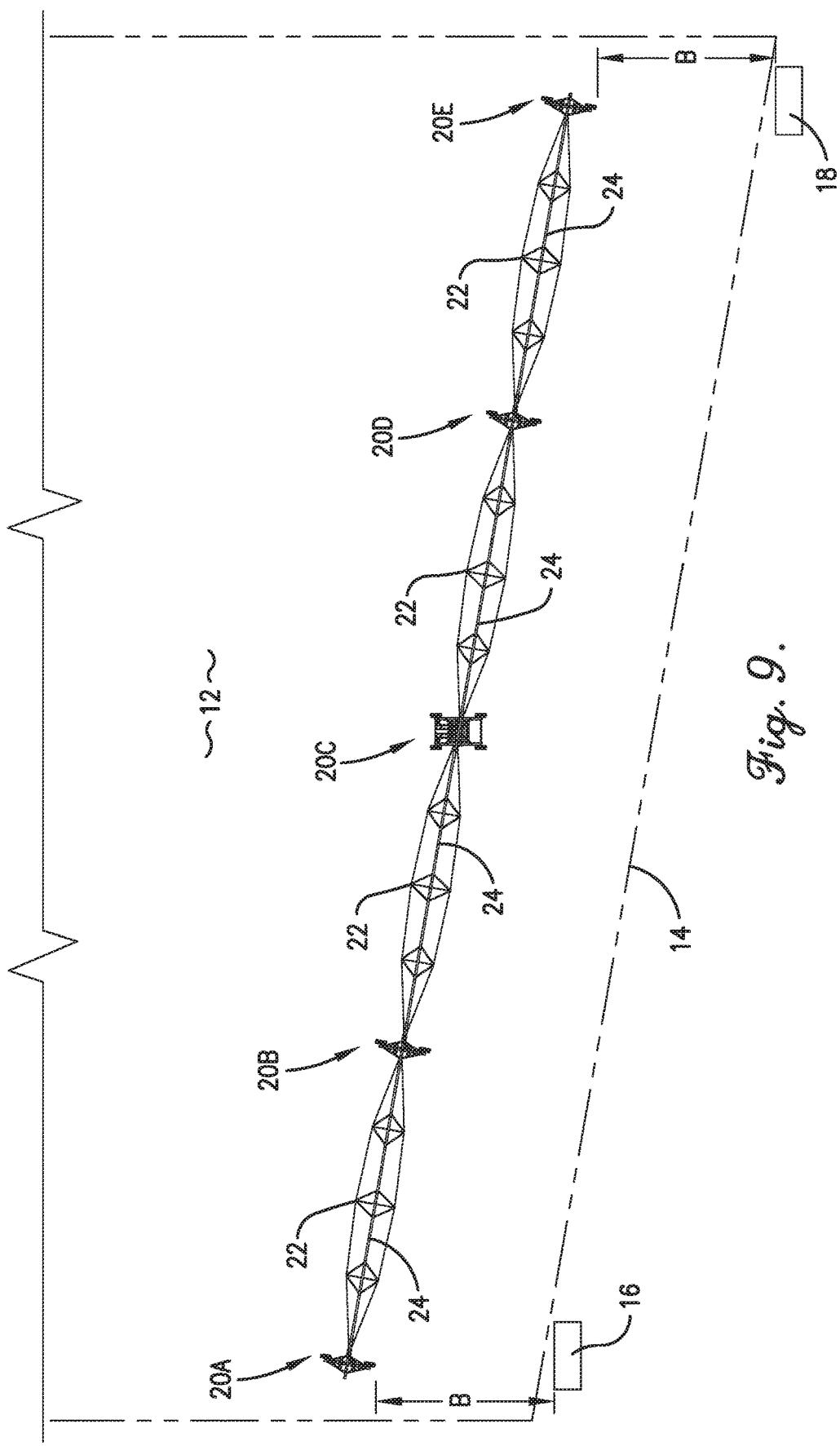
FIG. 9 is another top schematic view of the lateral irrigation system of FIGS. 3 and 4 operating in accordance with embodiments of the present invention.
Figure 10:
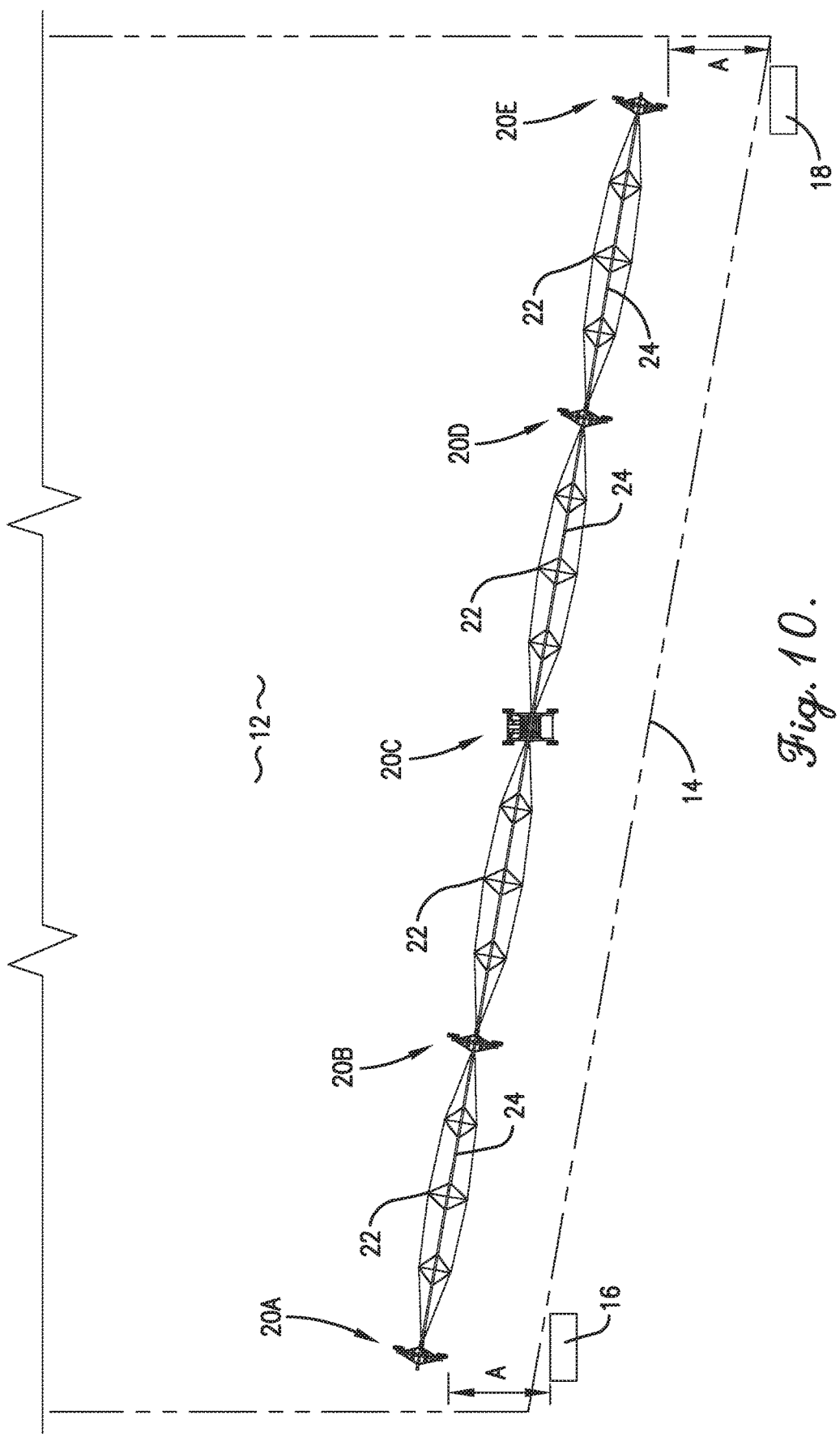
FIG. 10 is another top schematic view of the lateral irrigation system of FIGS. 3 and 4 operating in accordance with embodiments of the present invention.

In one embodiment, the control system 30 is configured to stop the motor 34 of any mobile tower 20A-E that reaches distance B from its end-of-run position if any of the other mobile towers has not yet reached distance B from its end of run position. For example, with reference to FIG. 5, the control system 30 my stop the motor 34 on mobile tower 20A because it is within distance B of its end-of-run position but may continue to operate the the motors on the other mobile towers 20B-E because they are not yet within distance B of their end-of-run positions. The control system subsequently stops the motor of each mobile tower that reaches distance B from its respective end-of-run position until all the mobile towers are approximately distance B from their end-of-run positions as shown in FIG. 6. Once all the mobile towers are within distance B of their respective end-of-run positions as shown in FIG. 6, the control system 30 operates the motors 34 on all the mobile towers 20A-E at substantially the same speed until at least one of the mobile towers reaches distance A of its end-of-run position and the safety circuit 20 stops and/or reverses the motors as depicted in FIG. 7. This prevents the safety circuit 26 from shutting down the irrigation system 10 until all of the mobile towers 20A-E are as close as possible to their end-of-run positions so as to minimize any un-irrigated areas in the field. The control system 30 may simultaneously control the fluid delivery system 24 so as to shut off water flow to any sprinklers adjacent a stationary mobile tower so as to avoid over-watering of areas below a stationary mobile tower.

In another embodiment of the invention in which the motors 34 of the mobile towers 20A-E are driven by variable speed drives, the control system 30 is configured to slow but not stop the motor 34 on any of the mobile towers that reaches distance B from its end-of-run position if any of the other mobile towers has not yet reached distance B from its end of run position. For example, with reference to FIG. 5, the control system 30 may progressively slow the motor on mobile tower 20A from full speed to a full stop over a selected distance and/or time period once it is within distance B of its end-of-run position but may continue to operate the motors on the other mobile towers 20B-E at a higher speed because they are not yet within distance B of their end-of-run positions. The control system 30 subsequently slows the motor 34 of each mobile tower that reaches distance B from its respective end-of-run position until all the mobile towers are no more than distance B from their end-of-run positions as shown in FIG. 6. Once all the mobile towers are within distance B of their respective end-of-run positions, the control system may operate the motors 34 on all mobile towers 20A-E at substantially the same speed until at least one of the towers reaches distance A of its end-of-run position and the safety circuit 26 stops the motors as depicted in FIG. 7. This prevents the safety circuit 26 from shutting down the irrigation system 10 until all of the mobile towers 20A-E are as close as possible to their end-of-run positions so as to minimize any un-irrigated areas in the field. The control system 30 may set different speeds for different motors 34 so that all the mobile towers 20A-E reach distance A of their end-of-run positions at about the same time and may control the fluid delivery system so as to reduce fluid delivery beneath any slowed or stopped mobile tower.

In yet another embodiment, the control system 30 also monitors a distance C, also referred to as a "third pre-determined distance." Distance C may be any distance between distance A and B. In this embodiment, the control system slows but not stops the motor 34 of any of the mobile towers that is within B of its end-of-run position if any of the other mobile towers is not yet distance B from its end of run position. For example, with reference to FIG. 5, the control system may slow the motor on mobile tower 20A from full speed to ¼ speed but may continue to operate the the motors on the other mobile towers at full speed because they are not yet within distance B of their end-of-run positions. The control system then stops the motor on each mobile tower as it reaches distance C from its end-of-run position. The control system thus slows the motors on the mobile towers as they reach distance B from their respective end-of-run positions and stops the motors once they reach distance C of their end-of-run positions. Once all the mobile towers are within distance C of their respective end-of-run positions, the control system operates the motors on all the mobile towers at substantially the same speed until at least one of the towers reaches distance A of its end-of-run position and the safety circuit 26 stops the motors 34 as depicted in FIG. 7. This prevents the safety circuit 26 from shutting down the irrigation system 10 until all of the mobile towers 20A-E are as close as possible to their end-of-run positions so as to minimize any un-irrigated areas in the field.

The above-described control schemes are only examples of how the control system 30 may operate the motors 34 of the mobile towers 20A-E to prevent the irrigation system 10 from shutting down pre-maturely and may be replaced and/or supplemented with other control schemes. For example, in other embodiments, the control system 30 may momentarily reverse the motor on any of the mobile towers that reaches distance B of its end-of-run position until all the mobile towers are substantially the same distance from their end-of-run positions.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An irrigation system comprising:
   a first mobile tower including wheels and a motor for driving the wheels;
   a second mobile tower including wheels and a motor for driving the wheels;
   a support section connecting the first and second mobile towers;
   a fluid-carrying conduit coupled with the support section;
   a plurality of fluid-emitting devices connected to the conduit for delivering fluids carried in the conduit to a field on which the lateral irrigation system moves;
   a safety circuit configured to automatically stop the motors on both the first and second mobile towers when either mobile tower is within a first pre-determined distance of an end-of-run position;
   a location determining component for determining a location of the first mobile tower;
   a location determining component for determining a location of the second mobile tower; and
   a control system in communication with the location determining components for controlling the motors on the first and second mobile towers to control movement of the mobile towers, the control system configured to—
      drive the motor of the first mobile tower and the motor of the second mobile tower so that the first mobile tower and the second mobile tower move simultaneously;
      stop or slow the motor on the first mobile tower if the first mobile tower is within a second pre-determined distance of the end-of-run position before the second mobile tower is within the second pre-determined distance of the end-of-run position; and
      stop or slow the motor on the second mobile tower if the second mobile tower is within the second pre-determined distance of the end-of-run position before the first mobile tower is within the second pre-determined distance of the end-of-run position, wherein the second pre-determined distance is greater than the first pre-determined distance.

2. The irrigation system of claim 1, wherein the control system is further configured to: operate the motors on the first and second mobile towers at a substantially equal speed when both the first and second mobile towers are within the second pre-determined distance of the end-of-run position but have not yet reached the first pre-determined distance of the end-of-run position.

3. The irrigation system of claim 1, wherein the control system is further configured to: reverse the motor on the first mobile tower if the first mobile tower is within the second pre-determined distance of the end-of-run position before the second mobile tower is within the second pre-determined distance of the end-of-run position; and reverse the motor on the second mobile tower if the second mobile tower is within the second pre-determined distance of end-of-run position before the first mobile tower is within the second pre-determined distance of the end-of-run position.

4. The irrigation system of claim 3, wherein the control system is further configured to: operate the motors on both the first and second mobile towers in a forward direction and at a substantially equal speed when both the mobile towers are an equal distance from the end-of-run position.

5. The irrigation system of claim 1, wherein the safety circuit includes shut-off switches with actuators mounted on the first and second mobile towers that stop the motors when either of the actuators engages an end-of-run barricade.

6. The irrigation system of claim 1, wherein the location determining components are GPS receivers mounted on the first and second mobile towers.

7. The irrigation system of claim 1, wherein the location determining components are switches mounted on the first and second mobile towers that are each triggered when its respective mobile tower is within the second pre-determined distance of the end-of-run position.

8. The irrigation system of claim 1, wherein the location determining components are sensors that sense distances between the first and second mobile towers and the end-of-run position.

9. The irrigation system of claim 1, wherein the location determining components are mounted remotely from the first and second mobile towers.

10. A lateral irrigation system comprising:
    a left end mobile tower including wheels and a motor for driving the wheels;
    a right end mobile tower including wheels and a motor for driving the wheels;
    a plurality of intermediate mobile towers positioned between the left end mobile tower and the right end mobile tower, each intermediate mobile tower including wheels and a motor for driving the wheels;
    a plurality of support sections connecting the left end mobile tower, the intermediate mobile towers, and the right end mobile tower;
    a fluid-carrying conduit supported by the support sections;
    a plurality of fluid-emitting devices connected to the conduit for delivering fluids carried in the conduit to a field on which the lateral irrigation system moves;
    a safety circuit configured to automatically stop the motors on all the mobile towers when any of the mobile towers is within a first pre-determined distance of an end-of-run position;
    location determining components for determining locations of the left end mobile tower, the right end mobile tower, and the intermediate mobile towers; and
    a control system in communication with the location determining components for controlling the motors on the mobile towers, the control system configured to—
       drive the motor of the left end mobile tower, the motor of the right end mobile tower, and the motors of the plurality of intermediate mobile towers so that the left end mobile tower, the right end mobile tower, and the intermediate mobile towers move simultaneously; and
       stop or slow the motor on any of the mobile towers that is within a second pre-determined distance of the end-of-run position if any of the other mobile towers is not within the second pre-determined distance of the end-of-run position.

11. The lateral irrigation system of claim 10, wherein the control system is further configured to: operate the motors on all of the mobile towers at a substantially equal speed when all of the mobile towers are within the second pre-determined distance of the end-of-run position but have not yet reached the first pre-determined distance of the end-of-run position.

12. The lateral irrigation system of claim 10, wherein the control system is further configured to: reverse the motor on any of the mobile towers that is within the second pre-determined distance of the end-of-run position if any of the other mobile towers is not within the second pre-determined distance of the end-of-run position.

13. The lateral irrigation system of claim 12, wherein the control system is further configured to: operate the motors on all the mobile towers in a forward direction and at a substantially equal speed when all the mobile towers are an equal distance from the end-of-run position.

14. The lateral irrigation system of claim 10, wherein the safety circuit includes shut-off switches with actuators mounted on the left end mobile tower and right end mobile tower that stop the motors when either of the actuators engages an end-of-run barricade.

15. The lateral irrigation system of claim 10, wherein the location determining components are GPS receivers mounted on the mobile towers.

16. The lateral irrigation system of claim 10, wherein the location determining components are switches.

17. The lateral irrigation system of claim 10, wherein the location determining components are sensors that sense distances between the mobile towers and the end-of-run position.

18. The lateral irrigation system of claim 10, wherein the location determining components are mounted remotely from the mobile towers.

19. A lateral irrigation system comprising:
a left end mobile tower including wheels and a variable speed motor for driving the wheels;
a right end mobile tower including wheels and a variable speed motor for driving the wheels;
a support section connecting the left end mobile tower and the right end mobile tower;
a fluid-carrying conduit supported by the support section;
a plurality of fluid-emitting devices connected to the conduit for delivering fluids carried in the conduit to a field on which the lateral irrigation system moves;
a safety circuit configured to automatically stop the motors on both the left end mobile tower and the right end mobile tower when either the left end mobile tower or the right end mobile tower is within a first pre-determined distance of an end-of-run position;
a location determining component for determining a location of the left end mobile tower;
a location determining component for determining a location of the right end mobile tower; and
a control system in communication with the location determining components for controlling the motors on the left end and right end mobile towers to control movement of the left end and right end mobile towers, the control system configured to—
drive the motor of the left end mobile tower and the motor of the right end mobile tower so that the left end mobile tower and the right end mobile tower move simultaneously;
slow the motor on the left end mobile tower if the left end mobile tower is within a second pre-determined distance of the end-of-run position before the right end mobile tower is within the second pre-determined distance of the end-of-run position;
stop the motor on the left end mobile tower if the left end mobile tower is within a third pre-determined distance of the end-of-run position before the right end mobile tower is within the second pre-determined distance of the end-of-run position;
slow the motor on the right end mobile tower if the right end mobile tower is within the second pre-determined distance of end-of-run position before the left end mobile tower is within the second pre-determined distance of the end-of-run position; and
stop the motor on the right end mobile tower if the right end mobile tower is within a third pre-determined distance of the end-of-run position before the left end mobile tower is within the second pre-determined distance of the end-of-run position; wherein the second pre-determined distance is greater than the first pre-determined distance and the third pre-determined distance is between the first pre-determined distance and the second pre-determined distance.

20. The lateral irrigation system of claim 19, wherein the control system is further configured to: operate the motors on the left and right end mobile towers at a substantially equal speed when both the mobile towers are within the third pre-determined distance of the end-of-run position until the safety circuit stops the motors.

* * * * *